(12) United States Patent
Noble, III et al.

(10) Patent No.: US 9,369,832 B1
(45) Date of Patent: Jun. 14, 2016

(54) METHOD AND SYSTEM FOR REMOTELY TRACKING MULTIPLE ASSETS AND UPDATING TEAM DATA

(71) Applicant: DeLorme Publishing Company, Yarmouth, ME (US)

(72) Inventors: Charles Noble, III, Gray, ME (US); Adrian Chamberland Smith, Topsham, ME (US); Noah DeLorme, Freeport, ME (US)

(73) Assignee: DELORME PUBLISHING COMPANY, Yarmouth, ME (US)

( * ) Notice: Subject to any disclaimer, the term of this patent is extended or adjusted under 35 U.S.C. 154(b) by 165 days.

(21) Appl. No.: 13/860,914

(22) Filed: Apr. 11, 2013

Related U.S. Application Data

(60) Provisional application No. 61/622,768, filed on Apr. 11, 2012.

(51) Int. Cl.
*G06F 15/16* (2006.01)
*H04W 4/02* (2009.01)

(52) U.S. Cl.
CPC ...................................... *H04W 4/02* (2013.01)

(58) Field of Classification Search
USPC ............. 455/456.1–456.3, 457; 342/450, 457
See application file for complete search history.

(56) References Cited

U.S. PATENT DOCUMENTS

2012/0214568 A1* 8/2012 Herrmann ....................... 463/16

OTHER PUBLICATIONS http://en.wikipedia.org/wiki/Vincenty%27s formulae; five pages; Apr. 9, 2013.

* cited by examiner

*Primary Examiner* — Sam Bhattacharya
(74) *Attorney, Agent, or Firm* — Patricia M. Mathers (57) ABSTRACT

A method for "team tracking" delivers position updates for multiple team members using a telecommunications network. Each team member/user carries a handheld and field-portable tracking and messaging device (TMD) that is used to send the current position of the device user to a networked server. The TMD has a built-in GPS receiver which provides the current position coordinates of the user. This position data is periodically transmitted via the telecommunications network to a central server. Team Status Messages (TSM) are sent regularly to each team member, the TSM containing the last known position of each team member. The position data are displayed over a map background, so that each member can see the positions of the other members. When tracking a target, a route is mapped to the target. If the target changes location, the next TSM that is sent indicates a re-calculated map to the target.

11 Claims, 12 Drawing Sheets

METHOD AND SYSTEM FOR REMOTELY TRACKING MULTIPLE ASSETS AND UPDATING TEAM DATA

BACKGROUND INFORMATION

1. Field of the Invention

The invention relates to the field of tracking the movements of multiple team members in remote areas. More particularly, the invention tracks the current position of individual team members using a wireless telecommunication system.

2. Discussion of the Prior Art

There are many types of field operations that rely on a team of co-workers to accomplish a task. Examples include military and search and rescue operations, or teams of field biologists working in remote locations, oil field workers, etc. It is possible to give each team member a GPSR-equipped device, that maps out a route from the member's current location to a target destination. It is desirable, however, to be able to map a route to a target destination that is not a fixed location, but a moving target. As it is now, conventional routing systems only function with a fixed target destination. If the target moves, the new target destination needs to be communicated via phone or text message to the team member, who then enters the new destination, in order for the device to re-map the route. It is also desirable in many cases, that the team members know where the other team members are.

DESCRIPTION OF THE INVENTION

The invention is a "team tracking" method, i.e., a method of delivering position updates for multiple team members using a telecommunications network. Each team member/user carries a handheld and field-portable tracking and messaging device that is used to send the current position of the device user to a networked server. For purposes of brevity, the handheld and field-portable tracking and messaging device is hereinafter referred to simply as the tracking and messaging device TMD. The TMD has a built-in GPS receiver which provides the current position coordinates of the user. This position data is periodically transmitted via the telecommunications network to a central server, where it is stored and also displayed over a map background to show the location of each user on a live map display. The TMD is capable of both sending and receiving data from the satellite network.

The communications network may be any suitable telecommunications network. In very remote locations, satellite may be the only communications system available. The examples described herein show and refer to a satellite communications network, but it is understood, that, depending on location and situation, other communication systems may be used, such as, for example, cellular or radio communication systems.

The TMD may have a screen and simple keyboard for text entry and viewing maps of user locations. The TMD may also wirelessly connect with a human interface device (HID), such as a smartphone, in order to view received messages and create new messages. The HID allows the user to view his or her own tracking history breadcrumb trail over a moving map display on the HID, and also see the location of other team members when messages are exchanged between remote field users.

The TMD and its eco-system (communications network, ground station, and network server) enable the delivery of position updates of an entire team of users to each remote field user, without any network connection except to the satellite network. When the network server receives a new periodic position update via satellite from each of the team members, a Team Status Message (TSM) is created that contains the last known positions (LKP) for each of the other team members. This TSM is ready to be sent to the TMD in response when each remote TMD reports its position to the network server. The received TSM contains team member position updates and each field user is able to see the locations of all other team members over a moving map display on the user's connected HID.

The TSM is queued up for delivery from the satellite just prior to receipt of each of the individual field users track message. The TSM is immediately transmitted from the satellite to the TMD during the handshaking process as each remote device delivers a track message. A user-specific timing algorithm determines when to collect the LKP of all the team members from the server to provide the most current position update of all team members to each individual field user. The timing algorithm also determines whether to schedule the TSM for delivery or to immediately send the message based on the current time relative to the next expected check-in of each user. The timing for the message assembly and delivery is based on the track reporting interval for each user, the timing of inbound track messages to the local satellite and network server, and the system latency.

Only the TSM of those team members who have reported their position since delivery of the last TSM is queued for delivery during the successive time period. If a recent update has not been received from a team member, then the TSM relating to that team member's position is not queued for delivery until after receipt of the team member's next track update.

Implementation of the team tracking method requires a field-portable, battery powered handheld tracking and two-way communications device. This two-way device communicates directly with a global satellite constellation that ideally provides pole-to-pole coverage to support the use of the two-way device anywhere on earth. The orbiting satellites interact with each other to move messages to a satellite that links directly with a ground station in order to connect to ground-based network. Downlinked messages are routed to a server connected to the ground network, and the server then sends messages back to the two-way device by up-linking messages from the ground station to the satellite for delivery back to the two-way device in any remote location.

Groups of two-way device users may be organized into a team tracking configuration on the server, the team configuration defining which users are part of the team and therefore which team members are included in the TSM delivered to each user on that team. The two-way device of each team member may be configured to receive the TSM to display the positions of all other team members on the map display of a HID. As the server receives each team member position update, the timing algorithm determines when the next consecutive update will arrive, and just prior to the update, assembles the TSM of that team member and the TSM is either scheduled or delivered, so it is available at the satellite for immediate download.

An example of a system using the method according to the invention is the INREACH communicator device from the DeLorme Publishing Company and the satellite constellation owned by Iridium Communications, Inc. The INREACH device is a two-way IRIDIUM satellite communicator with GPS that can pair with a smartphone via BLUETOOTH technology. The smartphone uses a DeLorme GPS application called EARTHMATE to allow the user to manage the INREACH device, read messages, type messages, and view the user's data over a moving map display.

A team equipped with the TMD, the GPS Receiver and mapping software is now able to dynamically track the movements of all team members and of a target destination, even a target that is moving. Thus, if one or more team members decide to create a route to another member or to a target, each team member will see the start and finish locations of every individual member, along with the distance and heading of the route as the members move.

DETAILED DESCRIPTION OF THE INVENTION

Figure 1:
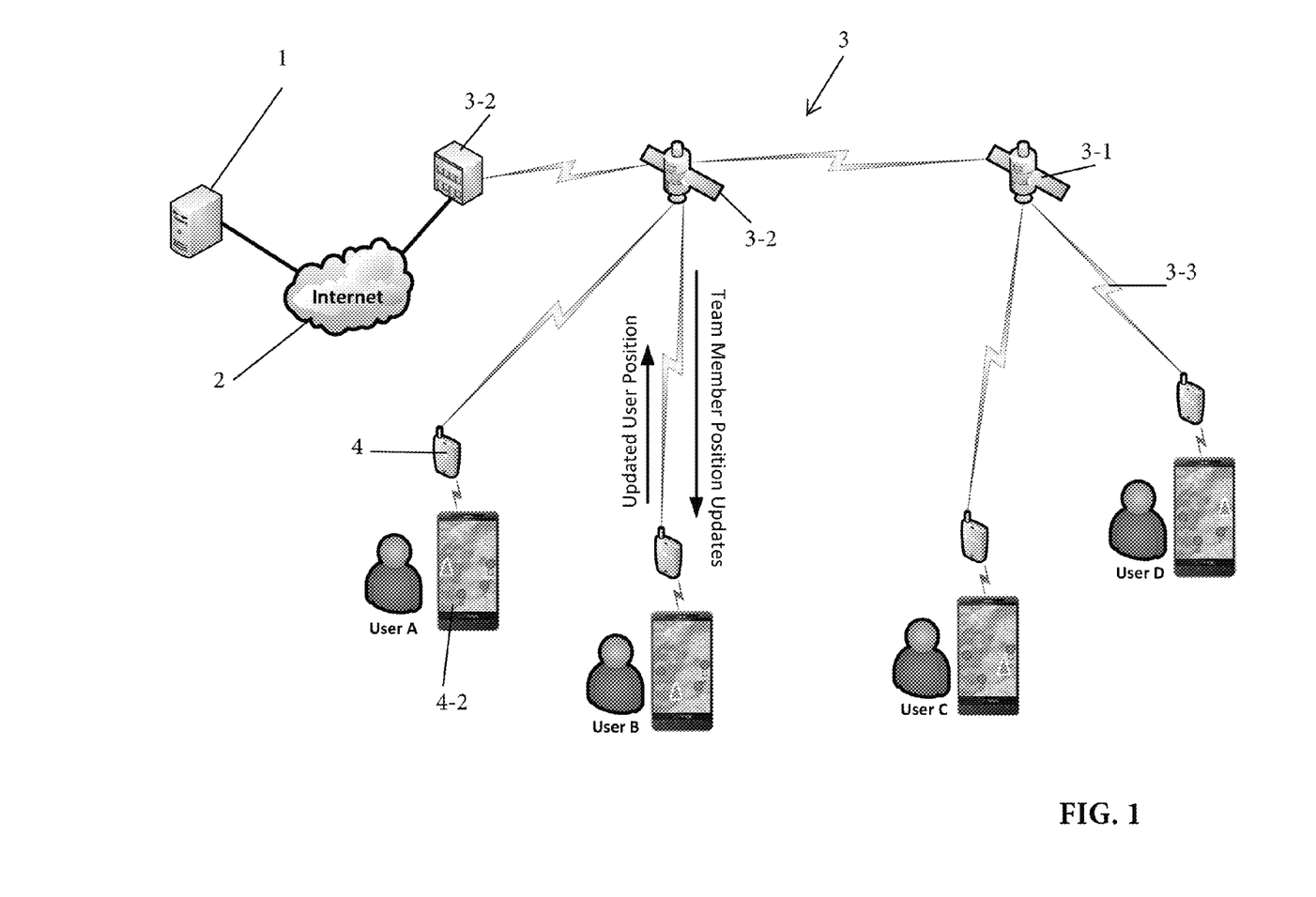
FIG. 1 is a schematic illustration of the components of the team tracking system according to the invention.

FIG. 1 illustrates system components of a team tracking method 100 according to the invention. The system components include a system server 1, the Internet 2, a communications network 3, and a handheld and field-portable two-way tracking and messaging device (TMD) 4. The communications network 3 shown in FIG. 1 comprises a plurality of satellites 3-1 and preferably, sufficient satellites to cover all areas on the planet, and a gateway 3-2. Each TMD 4 is equipped with a GPS receiver 4-1. The server 10 has mapping software that plots received GPS coordinates on a map. The team tracking method 100 allows each individual member of a team to see the locations and routes taken by every member of the team and to communicate via text message with each member of the team. Telecommunications lines 3-3 indicate that each TMD 4 is in two-way communication with one of the satellites 3-1 and, via the gateway 3-2 and the Internet 2, with the system server 1 located at some remote home base.

In the embodiment shown in FIG. 1, the TMD 4 also includes a human interface device (HID) 4-2, which may be a separate device, such as, for example, smart phone or a tablet computer having a display panel, or may be integrated into the TMD 4.

Figure 2:
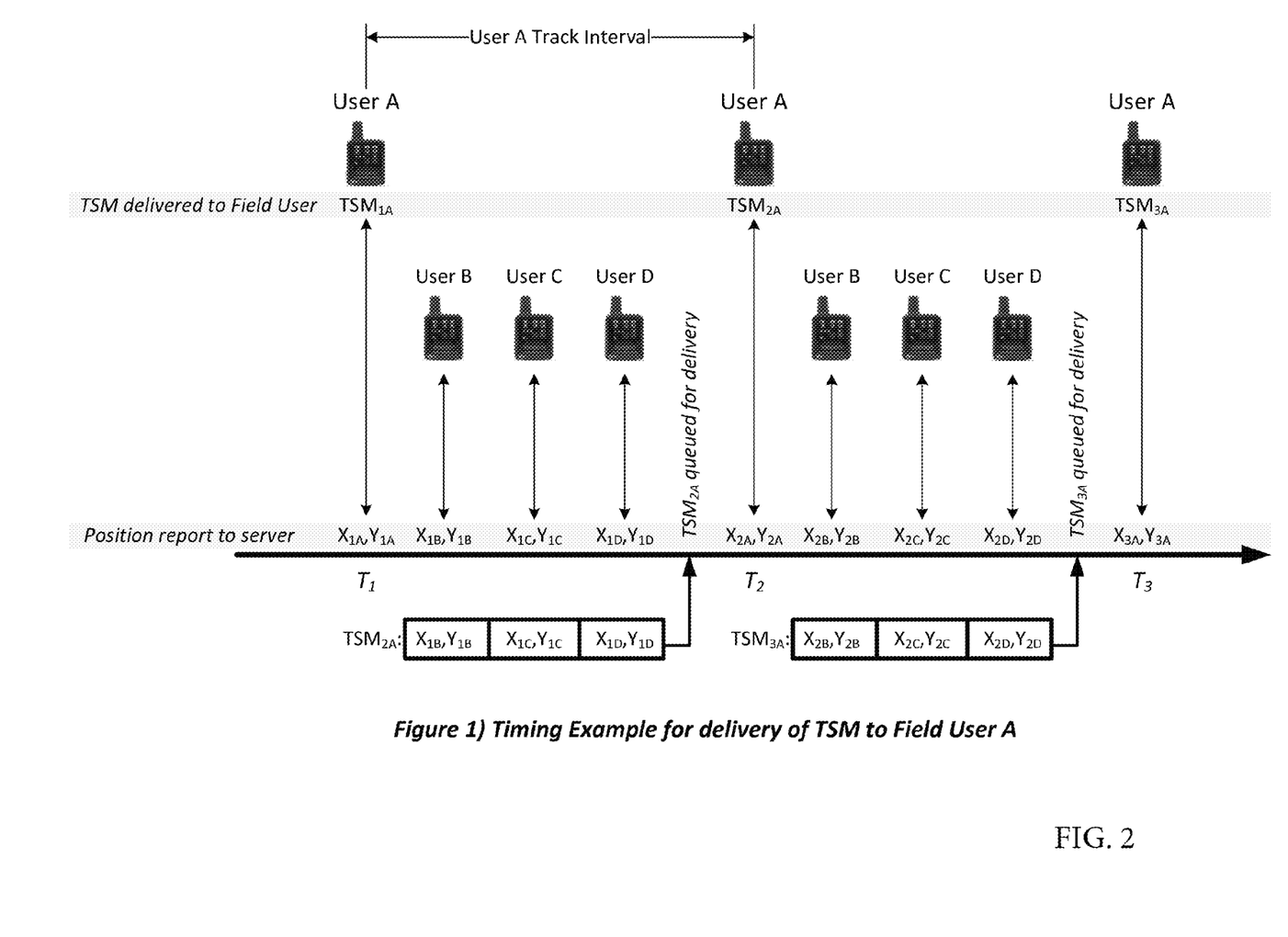
FIG. 2 is a timing example for delivery of the TSM to a field user.

FIG. 2 illustrates the timing example for delivery of the TSM to field User A, who is a member of a team comprising Users A-D. The TMD is programmed to send a check-in message to the communications network 3 at regular intervals. Shortly prior to receiving the expected message from User A's TMD, the communications network 3 queues up a team status message (TSM) for that user. When the communications network receives User A's TMD, it then sends out the TSM as part of the handshake operation. If no check-in message has been received from User A's TMD, the TSM is not sent out.

Well known algorithms, such as Vincenty's formulae are used for calculating the distance and heading of the team members. Vincenty's formulae is a mathematical technique that is used to calculate geodesic distances between a pair of latitude/longitude points on the earth's surface, using an accurate ellipsoidal model of the earth. The Wikipedia article "Vincenty's Formulae" contains a thorough explanation of the formulae. A printout of the article has been filed in an Information Disclosure Statement with this application and is incorporated herein in its entirety by reference.

Figure 3:
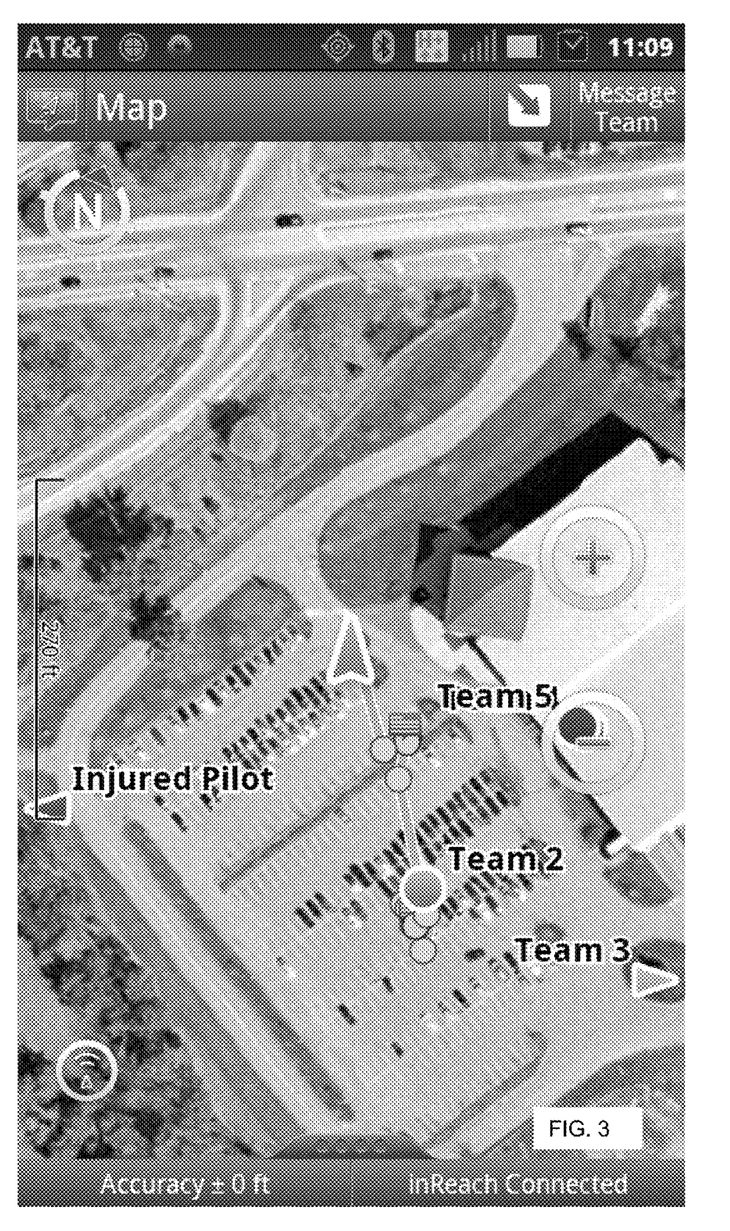
FIG. 3 is a screenshot of a map displayed on the TMD.

The team tracking method 100 according to the invention is now described, using the example of a team search and rescue operation. The scenario is that of a downed pilot who is carrying a tracking device. Several teams comprising a team leader and one or more team members and a command center cooperate to locate and reach the downed pilot. In this case, rather than each member, each team is carrying the TMD and the HID and can see its location plus the locations of the other teams. FIG. 3 is a screenshot showing position information for three teams, Team 2, Team 3, Team 5, and for the target destination, the injured pilot. In the device, the teams are indicated by color-coded circles. A triangle indicates the directions for the injured pilot and team 3, whose locations are beyond the parameters of the display. The arrow indicating the direction of the location of the pilot may be red, to indicate that the pilot is in an emergency state. The particular indicators used as location indicators may, of course, vary. As can be seen in FIG. 2, the location of the user of the particular device is indicated with a triangle and those of the other team members with a circle.

Figure 4:
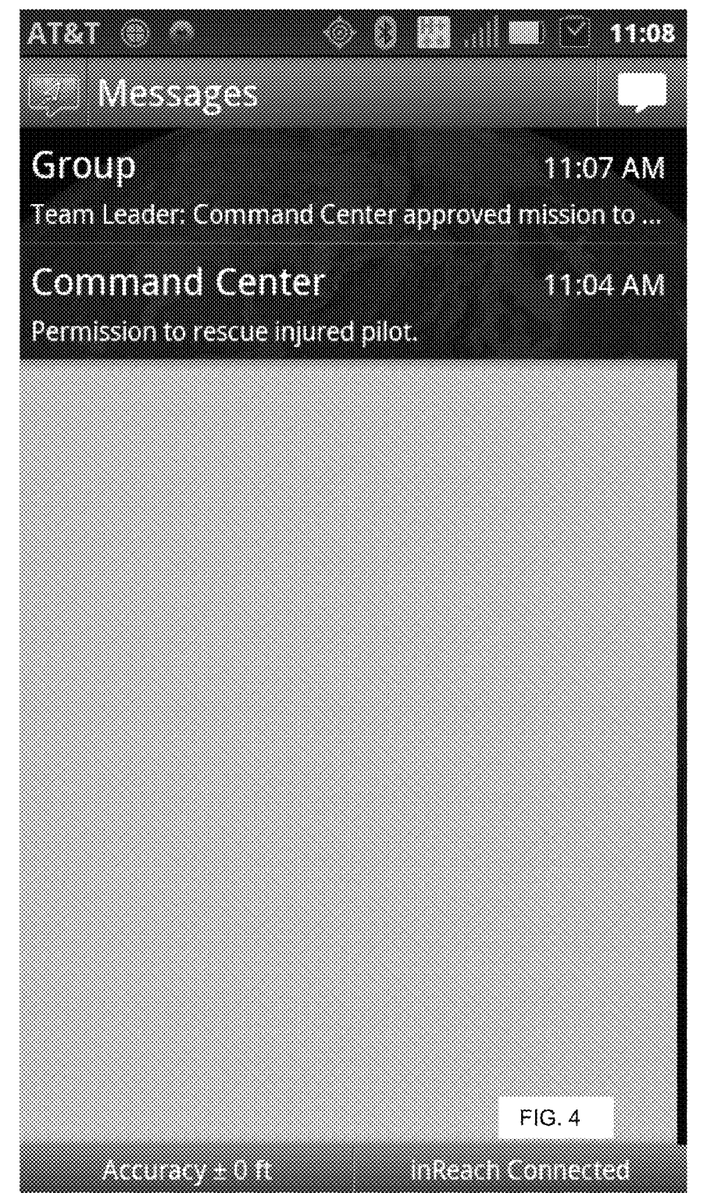
FIG. 4 is a screenshot showing a private message to the command center.

FIG. 4 is a screenshot showing that, after receiving the SOS message, the team leader sent a private message to the command center, requesting permission to rescue the pilot. The request was approved and the leader sent a group message to all team members, directing them to converge on the pilot's location.

Figure 5:
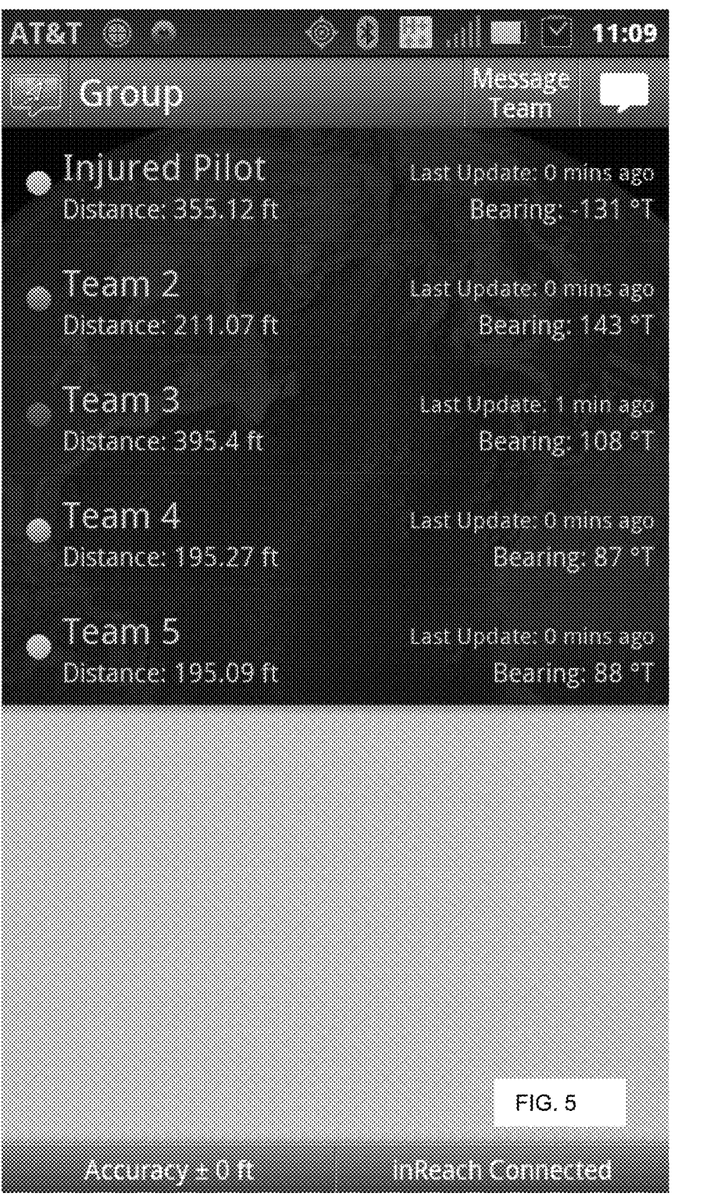
FIG. 5 displays the Team List.

FIG. 5 displays the Team List. After sending the team message, the leader reviews the list, to see how far away each team is and how long it has been since they reported in with a tracking message.

Figure 6:
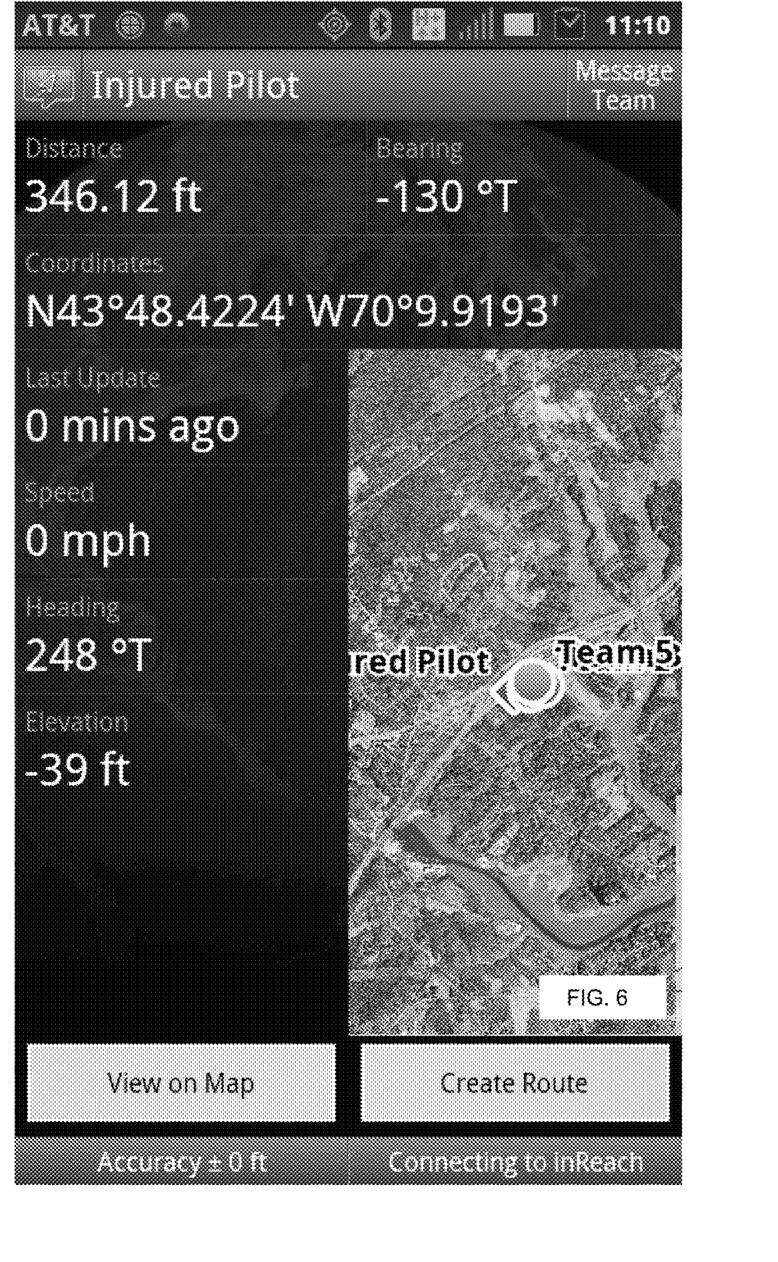
FIG. 6 displays detailed location information on the target.

Selecting the pilot from the list brings up detailed location information on the pilot, as shown in FIG. 6. The details show his Personal Location Information (PLI) along with distance and bearing, a map, and the time since he last checked in. Options on this page allow a team member to view the pilot's location on the map or create a direct route to his location. These actions are also available from a pop-up menu by tapping the pilot's symbol on the map.

Figure 7:
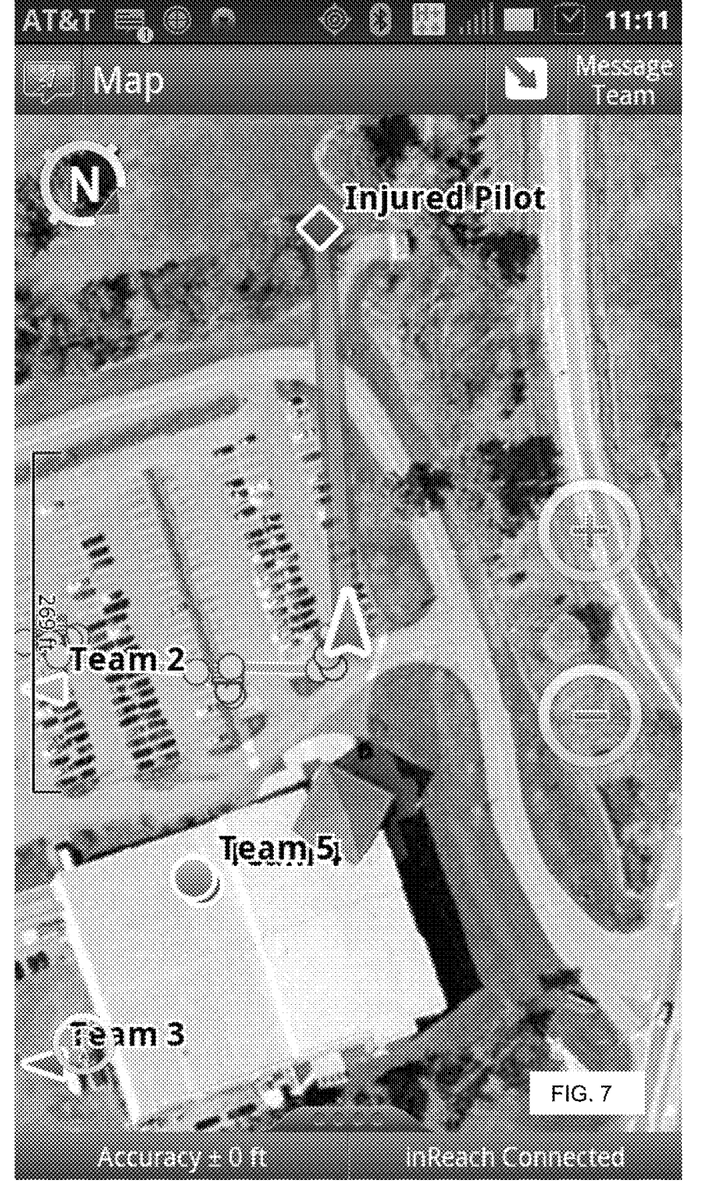
FIG. 7 displays a route mapped to the target.

As shown in FIG. 7, a route is mapped out to the pilot's location and a route highlight is displayed, representing the distance and bearing from the leader's location to the pilot. This route will update as the leader moves and also as the pilot's location changes. Note that Team 5 can see the locations of Team 2 and Team 3, even though they are off the screen. Also note that the SOS declaration of the pilot caused his symbol to change from a circle to a (red) diamond.

Figure 8:
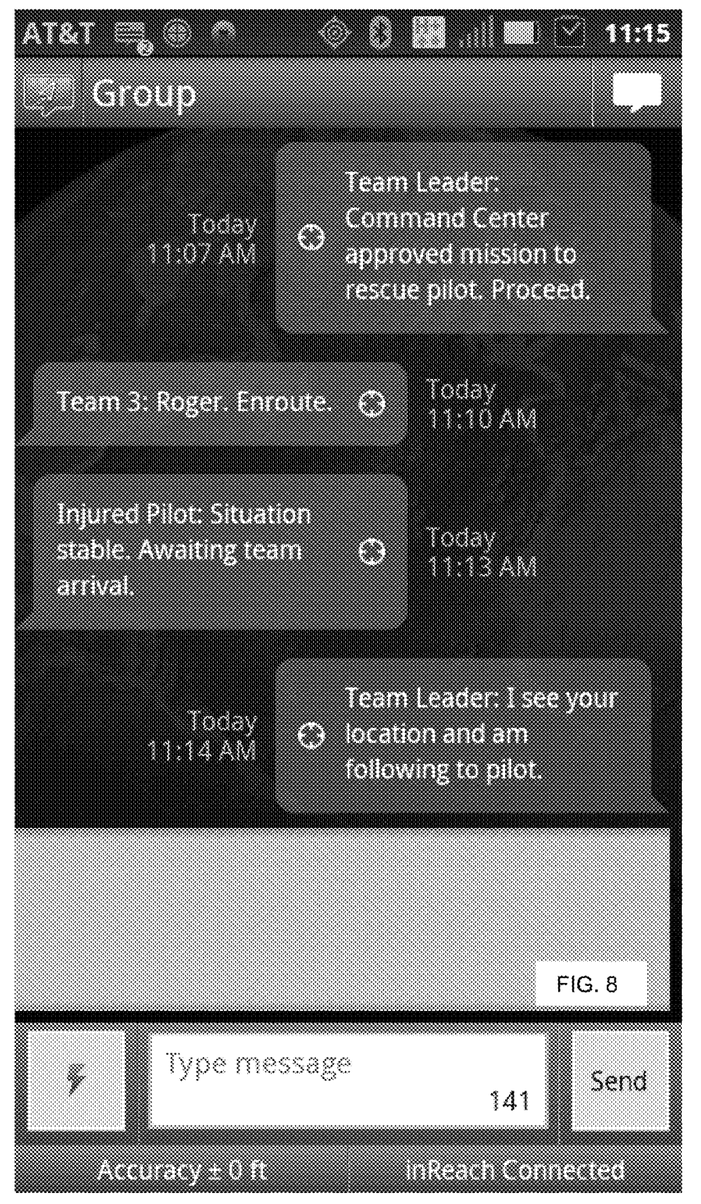
FIG. 8 shows check-in information.

FIG. 8 shows that, at this point, the pilot and the team member 3 have checked in. The status updates also show the group conversation thread. Users no longer need to select multiple recipients and then sort through replies in separate threads to piece together a conversation. Note the messages contain a location information symbol. These symbols tell the user that there are PLI details that can be viewed for the specific message.

Figure 9:
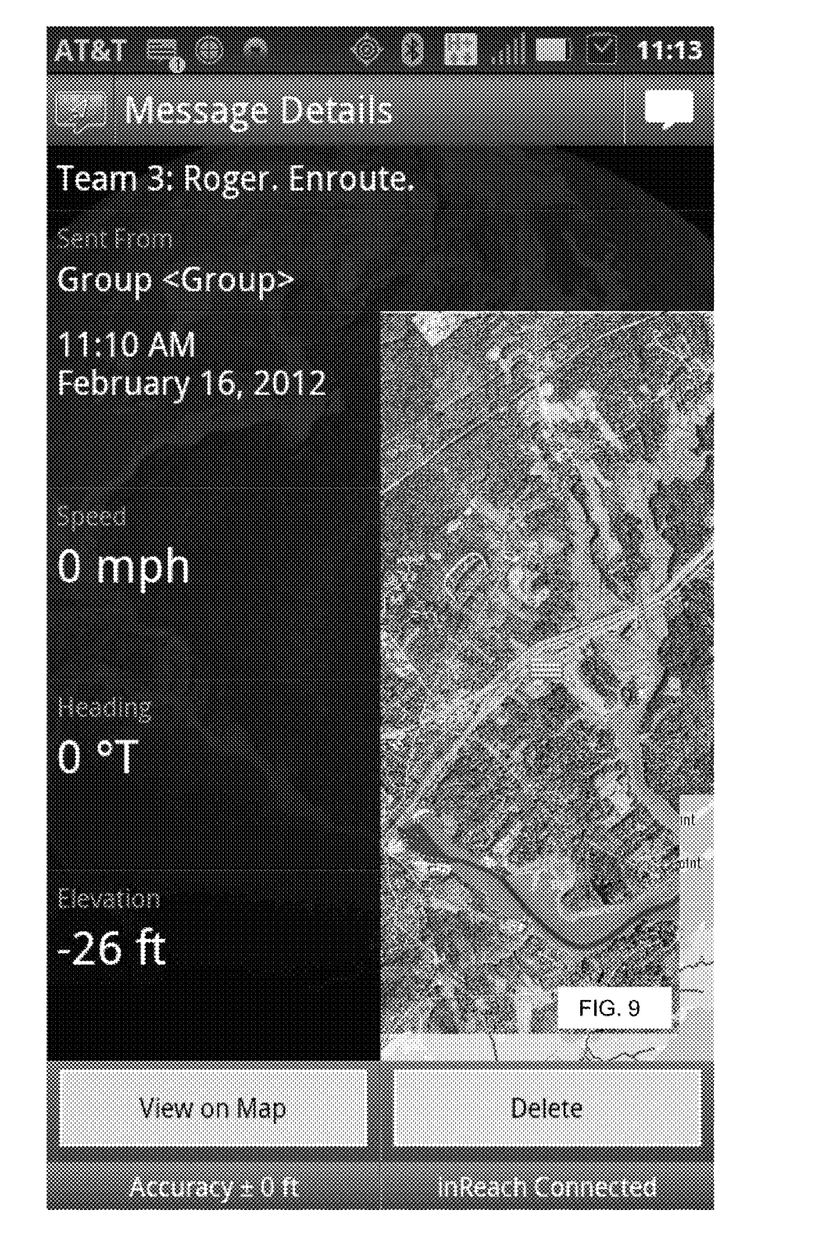
FIG. 9 shows that the team leader has selected a team member's TSM.

FIG. 9 shows that the team leader has selected Team 3's message, in order to obtain Team 3's PLI data, as well as its location on the map.

Figure 10:
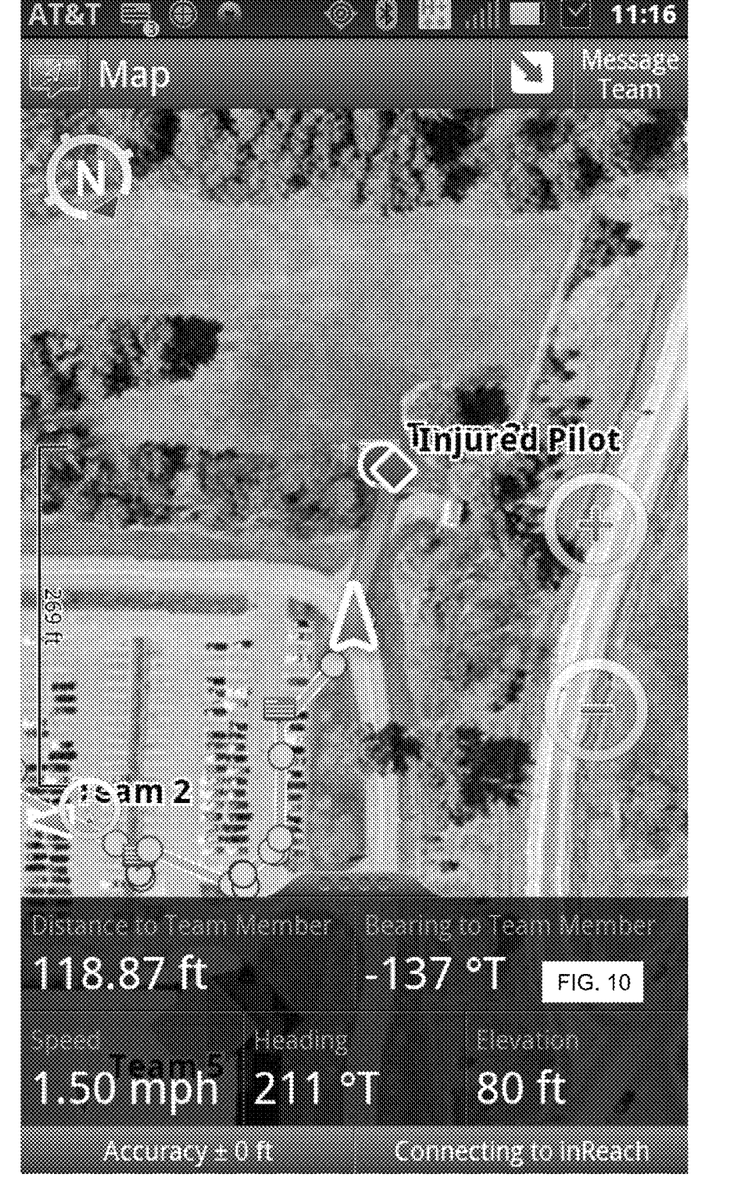
FIG. 10 gives information on the distance and bearing to the moving target.

FIG. 10 shows that the distance and bearing to the pilot is being updated, while moving. As mentioned above, if the pilot needs to change his location for whatever reason, his route and info field statistics automatically update as each new tracking message is received.

Figure 11:
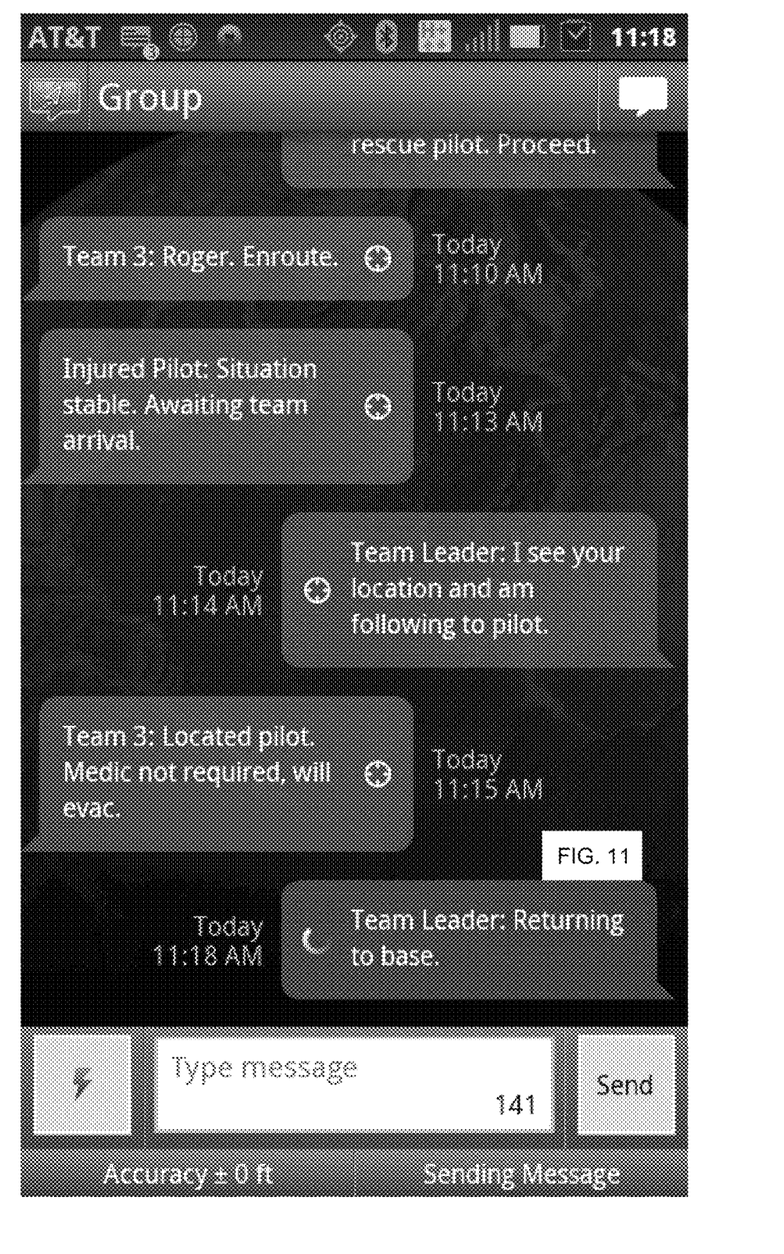
FIG. 11 shows that a team member has located the target and sent a message to the team and command center.

FIG. 11 shows that Team 3 has located the pilot and sent a message with this information to the team and the command center. The pilot checks in with an update message. After arriving at the pilot's location, the leader sends a message to the team and command center, announcing that they are returning to base.

Figure 12:
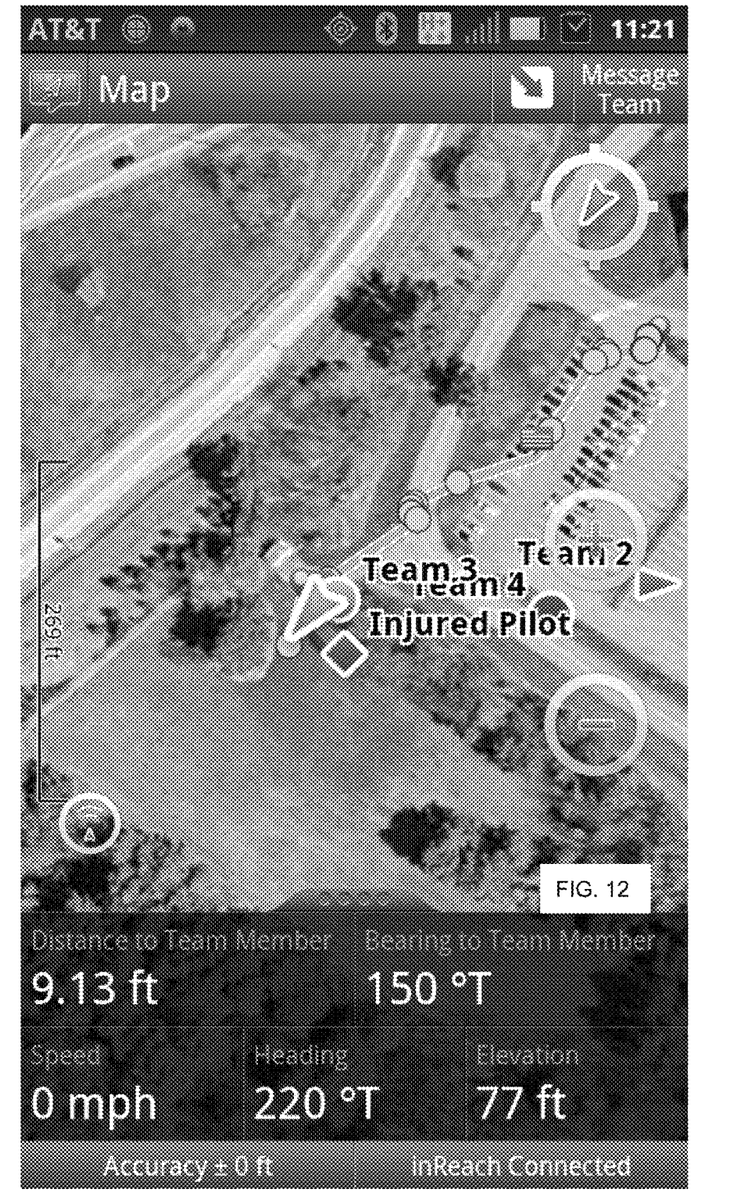
FIG. 12 shows the track line of the team member's approach to the target (pilot), the team member's location when messages were sent, the location of other team members, and the location of the downed pilot.

FIG. 12 shows the track line of the team leader's approach to the pilot, his location at the times when messages were sent, the location of the team members, and the location of the pilot.

What is claimed is:

1. A method of tracking members of a team, the method comprising the steps of:
    a) providing a computer server that has mapping software;
    b) identifying all members of the team;
    c) providing team members with a two-way tracking and messaging device (TMD) that includes a GPS receiver;
    d) providing a human interface device that has software for displaying a route laid out on a map;
    e) transmitting wirelessly a check-in message from the TMD via a telecommunications system and Internet to the server;
    f) automatically generating a team status message (TSM) that contains last known position (LKP) data of each TMD;
    g) transmitting the TSM to one or more TMDs of the team; wherein the LKP data for all TMDs allocated to the team is displayed on a map on each human interface device.

2. The method of claim 1, wherein the telecommunications system is a satellite communications network.

3. The method of claim 1, wherein the step of transmitting the check-in message includes automatically transmitting the LKP of the TMD at regular intervals.

4. The method of claim 3, wherein the step of transmitting the TSM to the one or more TMDs includes queuing the TSM and transmitting the TSM during a handshake operation when the TMD transmits the check-in message.

5. The method of claim 1, further comprising the step of providing a target with a GPS tracking device and mapping a route on the TMD of each team member to the target.

6. The method of claim 5, wherein the LKP of the target is tracked and, if the target is moving, mapping a re-calculated route to the target on the human interface device.

7. The method of claim 1, wherein the human interface device is a smart phone with a display panel.

8. The method of claim 1, wherein the human interface device is a handheld computing device with a display panel and access to the Internet.

9. The method of claim 1, wherein the communications network is a satellite telecommunications system.

10. The method of claim 1, wherein the communications network is a cellular telecommunications system.

11. The method of claim 1, wherein the communications network is a radio communications system.

* * * * *